United States Patent [19]

Mattson

[11] Patent Number: 4,480,738

[45] Date of Patent: Nov. 6, 1984

[54] WORKPIECE STORAGE AND SHUTTLE APPARATUS

[75] Inventor: Clyde E. Mattson, Waukesha, Wis.

[73] Assignee: Kearney & Trecker Corporation, West Allis, Wis.

[21] Appl. No.: 339,895

[22] Filed: Jan. 18, 1982

[51] Int. Cl.³ .............................................. B65G 47/00
[52] U.S. Cl. .................... 198/339; 198/472; 29/33 P; 29/563
[58] Field of Search ............... 198/339, 472, 341, 346, 198/345; 29/33 P, 563, 568; 414/280, 744 R, 223, 751

[56] References Cited

U.S. PATENT DOCUMENTS

| | | | |
|---|---|---|---|
| 2,707,666 | 5/1955 | Becker | 312/319 |
| 3,825,245 | 7/1974 | Osburn et al. | 198/472 |
| 4,133,423 | 1/1979 | Zankl | 198/339 |
| 4,181,211 | 1/1980 | Nishimura et al. | 198/472 |
| 4,291,797 | 9/1981 | Ewertowski | 198/472 |
| 4,326,624 | 4/1982 | Ewertowski et al. | 198/472 |
| 4,373,840 | 2/1983 | Miller, Jr. | 198/472 |

*Primary Examiner*—Joseph E. Valenza
*Assistant Examiner*—Daniel R. Alexander
*Attorney, Agent, or Firm*—Quarles & Brady

[57] ABSTRACT

An improved workpiece storage and shuttle apparatus is fabricated of a base into which a carousel is journaled for indexable movement. Located about the periphery of the carousel are a plurality of workpiece storage pedestals, each pedestal having a pair of spaced apart guides thereon, each of the guides being parallel to a carousel radii. Affixed on the carousel is at least one and preferably two pairs of spaced apart guides, each of the guides of each pair of carousel guides extending from the center of the carousel beyond the carousel periphery so as to be parallel to a carousel radii. Between each pair of carousel guides is a pallet shuttle arm which is extendable out from and retractable into the guides by a hydraulic cylinder. A hook is attached to the distal end of each pallet shuttle arm and is operative to releasably engage a workpiece carrying pallet, when, following extension of the pallet shuttle arm, the carousel is indexed to move the hook against a latch on the pallet, thereby enabling pallets to be pulled onto and pushed off of the carousel by each pallet shuttle arm.

4 Claims, 5 Drawing Figures

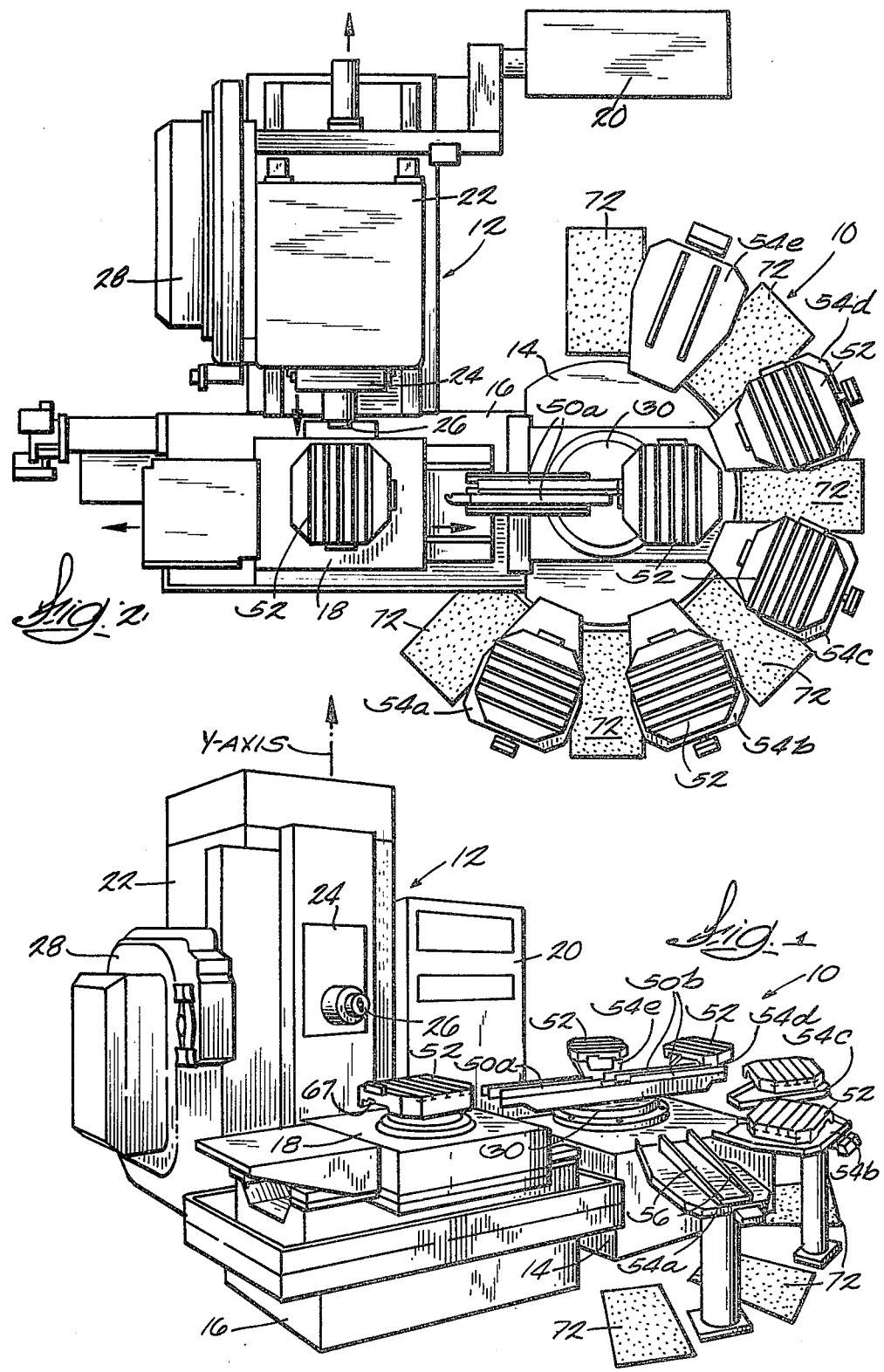

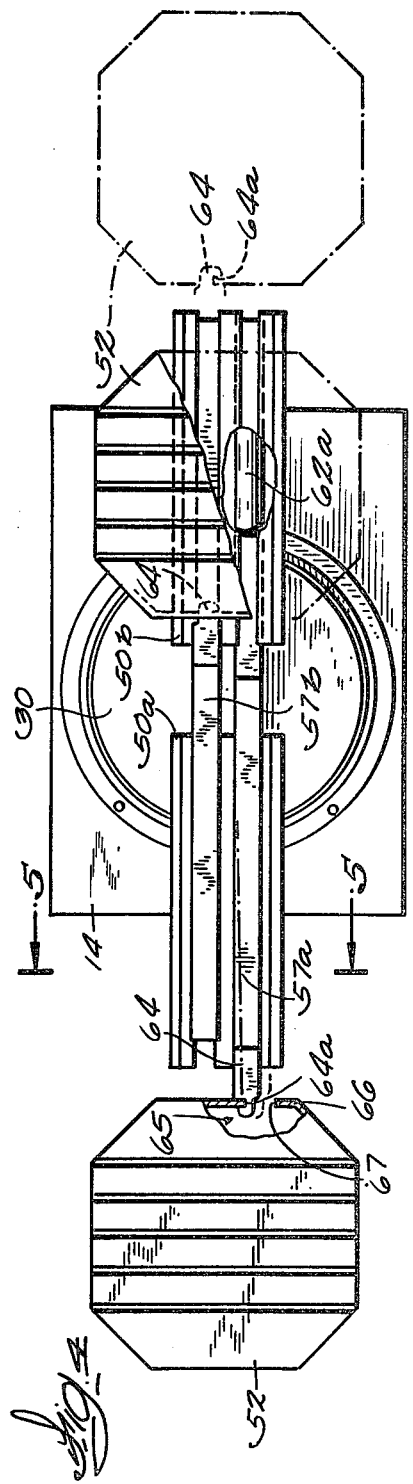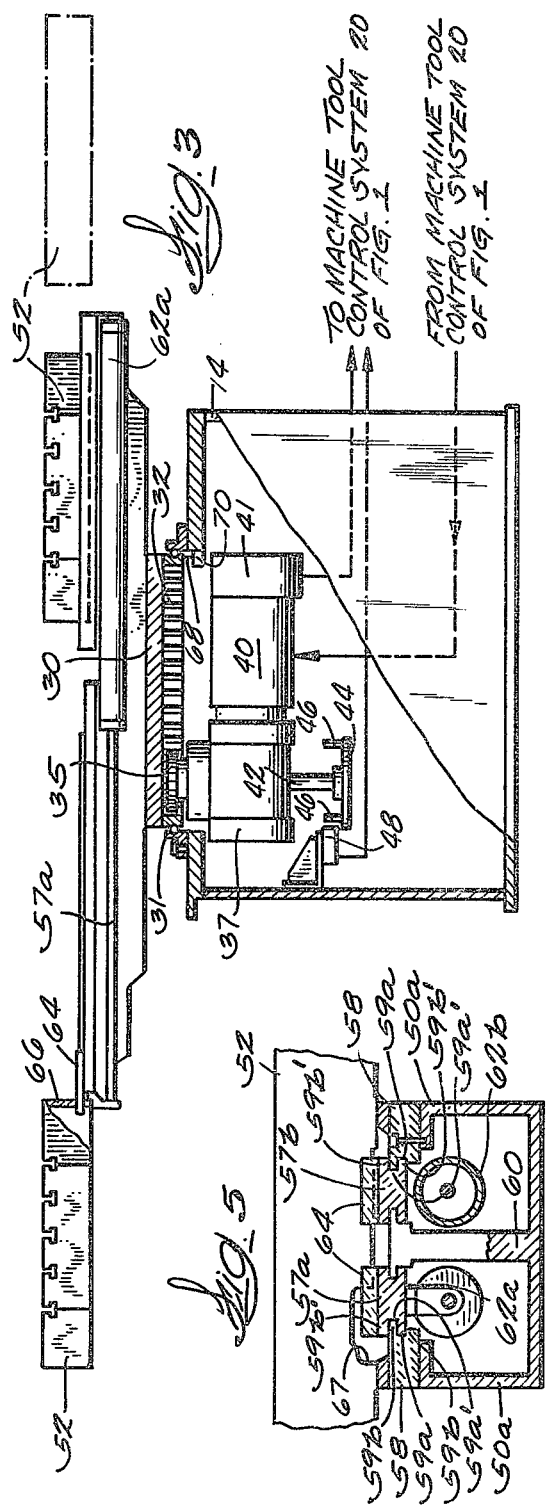

WORKPIECE STORAGE AND SHUTTLE APPARATUS

BACKGROUND OF THE INVENTION

This invention relates generally to workpiece shuttle mechanisms such as are found on machine tools and more specifically, this invention relates to an improved workpiece shuttle mechanism which is operative to store a plurality of workpiece carrying pallets and to shuttle a workpiece carrying pallet then at a selected storage location to the worktable of a machine tool or to shuttle the workpiece carrying pallet then on the machine tool to a storage location.

As conventional, manually operated, drilling and milling machines are being superseded by sophisticated computer numerically controlled machining centers which are capable of automatically performing a sequence of different machining operations on the workpiece without human intervention, the need to rapidly and efficiently shuttle parts onto and off of the machine tool is becoming increasingly more important. Because of the relatively large capital cost of such sophisticated numerically controlled machine tools, it is imperative that the then-completed workpiece on the machine tool table be interchanged as quickly as possible with an unfinished workpiece upon completion of the sequence of machining operations so that machine idle time can be kept at a minimum. By reducing machine idle time, machine productivity, that is the number of parts that can be machined during any given time, is maximized.

In the past, rapid and efficient interchange of workpieces has been achieved by equipping the computer numerically controlled (CNC) machining center with a workpiece changer or pallet shuttle mechanism which automatically interchanges the pallet carrying then-completed workpiece with a pallet carrying an unfinished workpiece after completion of the sequence of machining operations. Examples of prior art workpiece changers and shuttle mechanisms may be found in U.S. Pat. No. 3,825,245 issued on July 24, 1974 to John G. Osburn et al and U.S. Pat. No. 4,133,423 issued on Jan. 9, 1979 to Frank Zankl. Each of the above listed patents describes an apparatus for completing a single interchange of the workpiece then on the machine tool table with an unfinished workpiece stored on a single storage shuttle or table. Once an interchange has been completed between the then-completed workpiece on the machine tool table and the unfinished workpiece at the storage shuttle, then the now-completed workpiece on the storage shuttle must be manually replaced by the operator with an unfinished workpiece to enable a subsequent exchange by the workpiece changer when the now-unfinished workpiece on the machine tool table is machined.

The obvious drawback of such workpiece changer devices is that only one unfinished workpiece is stored by the workpiece changer so that even though interchange between a then-completed workpiece on the machine tool table with an unfinished workpiece on the workpiece changer shuttle can be accomplished quite rapidly and efficiently, human effort is still required to load and unload the workpiece changer shuttle. In an effort to reduce the frequency of manual part loading and unloading to enable relatively long periods (8-10 hrs.) of unattended machine tool operation, a pallet storage magazine and associated shuttle mechanism has been developed to enable multiple storage of unfinished and finished workpiece carrying pallets. Such a pallet storage magazine and shuttle mechanism comprises a conveyor which rotates on a base located adjacent to the machine tool bed. A plurality of pairs of pallet receiving and storage guides are fastened on the conveyor in spaced apart relationship so that each of the guides of each pair are parallel to each other. The conveyor rotates about two centrally located oppositely extending shuttle arms which are each extended and retracted by a hydraulic cylinder. Each shuttle arm has a "T" shaped finger at its distal end for mating with a complementary slot on each workpiece carrying pallet when, following arm extension, the arm is rocked by a tilting mechanism to locate the finger in the pallet slot.

While the above-described pallet storage magazine and shuttle mechanism enables multiple pallet storage in contrast to the prior art workpiece shuttle mechanisms described earlier, it is nonetheless subject to the disadvantage that two mechanisms must be provided, one to extend and retract each shuttle arm and the other to rock each shuttle arm to releaseably engage the "T" shaped finger at the distal end of the shuttle arm in the complementary receiving slot on the pallet. In contrast, the present invention concerns an improved workpiece storage and shuttle mechanism which is not subject to the disadvantages of present day pallet storage and shuttle mechanisms.

The principle object of the present invention is to provide a workpiece storage and shuttle mechanism which employs but a single mechanism for releaseably engaging the pallet and for shuttling the workpiece carrying pallet between one of the several storage locations and the machine tool table. By eliminating the need for separate mechanisms for releaseably engaging the pallet carrying workpiece and for shuttling the workpiece between one of the storage locations and the machine tool worktable, fabrication can thus be simplified and fabrication costs can be reduced. Another object of the present invention is to increase the speed at which pallets can be interchanged. Other objects and advantages of the invention will become apparent from the detailed description provided hereinafter.

BRIEF SUMMARY OF THE INVENTION

Briefly, in accordance with the preferred embodiment of the invention, an improved workpiece storage and shuttle mechanism for use on a machine tool for storing both finished and unfinished workpieces and for exchanging an unfinished one of the stored workpieces with the finished workpiece then on the worktable of a machine tool comprises a base located adjacent to the machine tool bed. A carousel is rotatably journaled into the base and is precisely indexed by a servo controlled motor in response to electrical signals generated by the machine tool control system indicative of the desired carousel angular orientation. On the carousel is at least one and preferably two pairs of parallel spaced apart guides, the guides of each pair of carousel guides extending out from the center of the carousel parallel to a carousel radii to beyond the periphery of the carousel with the guides of each pair being in alignment with, but extending oppositely to, each of the guides of the other pair of carousel guides. Located about the orbit of the carousel guides are a plurality of workpiece storage pedestals, each in spaced apart relationship with the others. Each workpiece storage pedestal has a pair of spaced apart guides thereon which are each parallel to a carousel radii for slidably receiving and supporting a workpiece carrying pallet thereon. A workpiece carrying pallet is transferred between the machine tool worktable and the carousel and between the carousel and one of the workpiece storage pedestals by one of a pair of pallet shuttle arms which are each slidably mounted between the guides of a separate one of each of the pair of carousel pallet guides for extension out from and withdrawal into the corresponding carousel guides by a hydraulic cylinder. A workpiece carrying pallet then on the machine tool table or on one of the workpiece storage pedestals is transferred onto a pair of carousel guides for subsequent transfer to a then-empty workpiece storage pedestal or to the machine tool table, respectively, by first indexing the carousel so as to position an empty pair of carousel guides slightly off the axis of the machine tool table or the workpiece storage pedestal carrying the pallet to be transferred onto the carousel so that the carousel guide shuttle arm may be fully extended out from the carousel. Once the shuttle arm is fully extended, the carousel is rotated to align the guides on either side of the now-extended shuttle arm with the guides of supporting the workpiece carrying pallet to be transferred onto the carousel, causing a hook on the distal end of the shuttle arm to be brought into engagement with a latch on the pallet. After the pallet shuttle arm hook engages the pallet latch, the shuttle arm is retracted to pull the workpiece onto the carousel guides. Transfer of the workpiece carrying pallet on the carousel guides is accomplished, following indexing of the carousel, by extending the shuttle arm to push the pallet off of the carousel and onto either the machine tool table or the guides of a workpiece storage pedestal. Disengagement of the shuttle arm from the just-transferred pallet is accomplished simply by rotating the carousel slightly off-axis of the just-transferred pallet which allows the now-extended pallet shuttle arm to be retracted.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a frontal perspective view of the improved workpiece storage and shuttle apparatus of the present invention shown in conjunction with a conventional horizontal spindle machining center;

FIG. 2 is a top view of the improved workpiece storage and shuttle apparatus of FIG. 1;

FIG. 3 is an end view of the improved workpiece storage and shuttle apparatus of FIG. 1;

FIG. 4 is an enlarged portion of the improved workpiece storage and shuttle apparatus of FIG. 2; and FIG. 5 is a cross sectional view of FIG. 4 taken along lines 5—5 thereof.

DETAILED DESCRIPTION OF THE IMPROVED EMBODIMENT

An improved workpiece storage and shuttle mechanism 10 for use with a numerical control machine tool, such as a horizontal spindle machining center 12, is illustrated in perspective in FIG. 1 and in top or plan view in FIG. 2. Workpiece and storage mechanism 10 comprises a base 14 which is located adjacent to the bed 16 of machine tool 12 so as to be in alignment with the path of travel of the machine tool worktable 18 on machine tool bed 16. In practice, machine tool 12 is provided with a numerical control system, typically a computer numerical control system 20 for controlling not only the movement of table 18 on bed 16 but also the movement of machine tool column 22 along bed 16 in a direction perpendicular to the path of movement of the machine tool table on the machine tool bed. Further, machine tool control system 20 also controls the movement of the machine tool spindlehead 24 along machine tool column, together with the rotational movement of the machine tool spindle 26 as well as auxiliary machine tool functions such as the operation of the automatic tool changer 28 and the operation of workpiece transport and shuttle mechanism 10.

In the present embodiment, base 14 of apparatus 10 has a carousel 30 rotatably journaled therein for rotation about an axis parallel to the axis (FIG. 1) along which spindlehead 24 moves on column 22 of the machine tool, this axis being designated as the Y axis. Referring now to FIG. 3, which is a cutaway end view of apparatus 10, it can be seen that carousel 30 is rotatably journaled in base 14 by a bearing 31. Circumscribing the inner periphery of the inner race of bearing 31 is a ring gear 32 which is dimensioned to meshingly engage a gear 35 carried on the output shaft of a right angle gear train 37 secured within the base. The input shaft (not shown) of gear train 37 is driven by a servo controlled motor 40 having an internal feedback transducer 41 for generating electrical signals indicative of motor shaft position. The output signals from feedback transducer 41 are supplied to machine tool control system 20 (FIGS. 1 and 2) which, in accordance with the feedback transducer signals, controls the excitation of motor 40 responsive to numerical control commands indicative of the desired carousel angular orientation, to achieve precise positioning of the motor output shaft and hence, precise angular positioning of carousel 30.

Extending downwardly from gear train 37 is an auxiliary output shaft 42 which is coaxial to the gear train output shaft driving gear 35 and rotates co-jointly therewith. At the distal end of shaft 42 is a coaxially mounted plate 44 having a plurality of dogs 46 disposed through the plate periphery, the dogs being spaced about the plate at a 45° angle from each other. A proximity detector 48 is secured to the interior of base 14 so as to be adjacent to plate 44. Each time one of dogs 46 comes into proximity with detector 48, the detector provides a pulse to machine tool control system 20. By knowing the initial position of carousel 30 and by counting the number of pulses produced by proximity detector 48 as carousel 30 is rotated by servo-controlled motor 40, the machine tool control system can ascertain the approximate angular orientation of the carousel. The combination of plate 44, dogs 46 and proximity detector 48 serves, in addition to the feedback transducer 41 within motor 40, to provide an approximation of the angular orientation of carousel 30 so that in the event feedback transducer 41 within motor 40 becomes inoperative, the machine tool control system will still maintain a knowledge of the carousel angular position.

Referring now to FIGS. 1–4 jointly, carousel 30 has at least one and preferably two pairs of spaced apart guides 50a and 50b fastened on the top surface thereof, with the guides of each pair of guides extending outwardly from the center of the carousel and therebeyond parallel to a carousel radii so as to overlie base 14. Each of the guides of each pair of carousel guides is in alignment with, but extends diametrically opposite to, a separate one of the guides of the other pair of carousel guides. The spacing between the guides of each pair of carousel guides is identical to the spacing in between the pallet receiving guides (not shown) which are carried on machine tool table 18 to support a pallet 52 (FIGS. 1 and 2) thereon. As will become better understood hereinafter, by making the spacing between the guides of each of carousel pallet guides identical to the spacing between the machine tool table pallet guides, a pallet then on the pallet guides on the machine tool table can be transferred onto an empty one of the two pairs of carousel pallet guides when the carousel is indexed to align the empty pair of carousel pallet guides with the machine tool table pallet guides. Conversely, a pallet then on one of the pairs of carousel pallet guides can be transferred to the empty machine tool worktable pallet guides while the carousel is indexed to align the carousel pallet guides with the machine tool table pallet guides.

Referring now to FIGS. 1 and 2, a plurality of free standing, fixed height, workpiece supporting pedestals, typically five in number and each identified by a consecutive one of reference numerals 54a through 54e, respectively, are located in semicircular fashion about the arc circumscribed by the tip of each of the guides of each pair of carousel pallet guide pairs 50a and 50b. Each workpiece pedestal, such as workpiece storage pedestal 54a, for example, has a pair of spaced apart pallet receiving guides 56 thereon, each dimensioned identically to the guides of carousel pallet guide pairs 50a and 50b and each extending across the pedestal parallel to a carousel radii so as to be adjacent to the arc circumscribed by the tip of the carousel pallet guides. To facilitate pallet transfer between carousel 30 and each of workpiece storage pedestals 54a-54e, the spacing between pallet receiving guides 56 on each workpiece storage pedestal is identical to the spacing between the guides of each of carousel pallet guide pairs 50a and 50b, and the height of each of workpiece storage pedestals 54a through 54e is such that the guides on each workpiece storage pedestal lie in the same horizontal plane as the guides of carousel pallet guide pairs 50a and 50b so that when the carousel is indexed to locate each of the guides of one of pallet guide pairs 50a and 50b in alignment with each of the pallet receiving guides 56 on one of workpiece storage pedestals 54a through 54e, a pallet can be slidably moved off of the workpiece storage pedestal pallet guides and onto the carousel pallet guides and vice versa. In practice, the guides of each of carousel pallet guide pairs 50a and 50b have replaceable ways fastened thereon (described in greater detail with respect to FIG. 5) and likewise, guides 56 on each of workpiece storage pedestals 54a-54e also have replaceable ways (not shown) fastened thereon. The addition of ways on the guides reduces pallet friction as the pallet is transferred across the guides. Further, the use of ways on the guides reduces guide maintenance because the ways can be easily replaced when their surfaces become worn, in contrast to having to resurface the guides themselves by planing or grinding.

Referring now to FIG. 2 and more particularly to FIG. 4, which is an enlarged view of a portion of the apparatus illustrated in plan view of FIG. 2, transfer of a pallet between one of carousel pallet guide pairs 50a and 50b and one of workpiece storage pedestals 54a through 54e or between one of the carousel pallet guide pairs 50a and 50b and the pallet guides on machine tool worktable 18 is accomplished by one of a pair of pallet shuttle arms 57a and 57b which are each slidably mounted between the guides of a separate one of carousel pallet guide pairs 50a and 50b, respectively. The details of how each shuttle arm is slidably mounted between the guides of each of carousel pallet guide pairs 50a and 50b are illustrated in FIG. 5 which is a cross sectional view taken along lines 5—5 of FIG. 4. As illustrated, each of a pair of ways 58 is fastened to each of the guides of each carousel pallet guide pair, such as carousel pallet guide pair 50a. Each of ways 58 has an axially extending tongue 59a and an axially extending groove 59b on its inward facing side for each engaging a complementary groove 59b and a complementary tongue 59a, respectively, on the outward facing side of each of pallet shuttle arms 57a and 57b, respectively. The top edge of the groove on the outward facing side of each of the pallet shuttle arms overlies the tongue on a separate one of ways 58. A centrally disposed rib 60, located equidistantly between each of the guides of each of the carousel pallet guide pairs, has an axially extending tongue on either side thereof for engaging a complementary groove on the inner side of each of pallet shuttle arms 57a and 57b so that each pallet shuttle arm is slidably supported between one of ways 58 and rib 60. Pallet shuttle arms 57a and 57b are each linked to a separate one of hydraulically actuated cylinders 62a and 62b, which are each secured between the guides of a separate carousel pallet guide pair, respectively. Depending on the pressurization of each of cylinders 62a and 62b, which is controlled responsive to commands from machine tool control system 20, a corresponding one of pallet shuttle arms 57a and 57b, respectively, is either extended out from or withdrawn into a corresponding one of carousel pallet guide pairs 50a and 50b, respectively, to push a pallet off of the carousel guides or to pull a pallet onto the carousel guides, respectively.

Referring now to FIG. 4, releaseable engagement between each of shuttle arms 57a and 57b and the pallet to be pulled onto or pushed off of the carousel guides by the pallet shuttle arm is achieved by a pair of hooks 64 which are each carried on the distal end of a separate one of the pallet shuttle arms. Each hook 64 has a notch 64a which is dimensioned to engage a complementary latch 65 carried by each of pallets 52. In practice, the pallet latch consists of a skirt 66 surrounding the periphery of the pallet, the skirt having an opening 67 therein which is located so as to receive hook 64 when the pallet shuttle arm is extended after the carousel has been indexed so as to be slightly off the axis (approximately 5°) of the guides on either the workpiece storage pedestal or on the machine tool table then supporting the pallet. When carousel 30 is indexed to align each of the carousel pallet receiving guides on either side of the now extended pallet shuttle arm, with the guides supporting the pallet, the notch 64a of hook 64 engages that portion of pallet skirt 66 contiguous with opening 67 so that the shuttle arm, such as shuttle arm 57a, is in engagement with the pallet to enable the pallet to be pulled onto the carousel guides and to be pushed subsequently off of the carousel pallet guides.

Referring back to FIG. 3, a plurality of dogs 68 (only one of which is shown) are each affixed to the undersurface of ring gear 32 so as to extend downwardly therefrom. Dogs 68 are spaced about ring gear 32 so that a separate one of the dogs is in contact with a detector 70, affixed to the undersurface of base 14 and coupled to the machine tool control system, when the guides of one of carousel pallet guide pairs 50a and 50b are in alignment with the guides on one of workpiece storage pedestals 54a through 54e. Unless detector 70 is actuated by one of dogs 68, the pallet then on the guides of the carousel pallet guide pair furthest from machine tool table 18 is not pushed off of one of carousel pallet guides while that pair of carousel guides is indexed between a pair of workpiece storage pedestals, thereby avoiding accidental discharge of the pallet from the carousel pallet guide pair while the carousel pallet guides are not in alignment with the guides on one of the workpiece storage pedestals.

As an additional safety measure, safety mat switches 72 (FIGS. 1 and 2) are each placed on either side of the base of each of workpiece storage pedestals 54a–54e. Each of safety mat switches 72 is coupled to the machine tool control system and when any one of the safety mat switches is actuated by an operator, such as would occur were an operator to stand on either side of a workpiece storage pedestal to load or unload that pedestal, then, machine tool control system 20 inhibits servo controlled motor 40, to prevent rotation of carousel 30, thereby virtually eliminating the likelihood of the operator being struck by one of the carousel pallet guide pairs 50a and 50b.

In operation, a pallet is transferred from one of workpiece storage pedestals 54a through 54e to machine tool table 18 as follows.

1. Carousel 30 is indexed to locate an empty pair of pallet carousel guides slightly off the axis of the guides of the workpiece storage pedestal carrying the desired pallet to be transferred.
2. Next, the pallet shuttle arm between the then-empty carousel pallet guide is extended by appropriate pressurization of a corresponding one of hydraulic cylinders 62a and 62b so that hook 64 at the end of the pallet shuttle arm extends through the opening 67 in the pallet skirt 66.
3. Thereafter, carousel 30 is rotated to align the carousel pallet guides with the workpiece storage pedestal pallet guides which results in the hook at the distal end of the now-extended pallet shuttle arm being brought into engagement with the pallet skirt.
4. The hydraulic cylinder associated with the now-extended pallet shuttle arm is pressurized to withdraw the pallet arm into the guides so as to pull the pallet off of the workpiece storage pedestal and onto the guides of the carousel pallet guide pair.
5. Carousel 30 is then indexed to align the guides of the carousel pallet guide pair carrying the just-loaded pallet with the pallet guides on workpiece table 18 which had previously been moved so as to now be adjacent to base 14.
6. Finally, the pallet is pushed off of the carousel pallet guides and onto the workpiece table guides by appropriate pressurization of the pallet shuttle arm cylinder and then the carousel is indexed to position the carousel pallet guides slightly off of the axis of the workpiece table guides to unlatch hook 64 from the pallet skirt, thereby enabling the pallet shuttle arm to be withdrawn into the guides.

Transfer of a workpiece carrying pallet then on the guides of machine tool table 18 to one of the workpiece storage pedestals is accomplished in a very similar manner.

Although not shown, in certain applications, most particularly where machine tool 12 is part of a flexible manufacturing system, it might be desirable to interface the flexible manufacturing system transport system to workpiece shuttle and transport mechanism 10 to enable workpiece carrying pallets to be received from or transferred to other work stations. Such interfacing could be accomplished by providing a conventional pallet shuttle mechanism such as are well known in the art between the distal end of one of the workpiece storage pedestals 30 and the flexible manufacturing system transport mechanism to transfer pallets onto or off of the guides of the workpiece storage pedestal.

The foregoing describes a workpiece storage and shuttle mechanism for storing a plurality of workpieces and for releaseably engaging a workpiece and transporting the workpiece between a storage location and the machine tool worktable.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

What is claimed is:

1. Apparatus for use with a machine tool or the like for storing a plurality of workpieces and for shuttling a selected workpiece between a storage location and the worktable of said machine tool comprising:
   a base adjacent to said machine tool;
   a carousel supported by said base;
   a plurality of workpiece storage means disposed to cooperate with said carousel and adapted to slidably support a workpiece carrying pallet;
   workpiece transfer means supported by said carousel for movement therewith and adapted to be coupled to said workpiece carrying pallet;
   means connected to move said carousel for shifting said workpiece transfer means in unison therewith and into engagement with a selected pallet for coupling said workpiece transfer means to said pallet;
   means for actuating said workpiece transfer means to shift a pallet coupled thereto; and
   a plurality of safety mat switches each located between an adjacent pair of workpiece storage means for indicating the presence of a human operator between each of said workpiece storage means.

2. In an article transfer mechanism for transferring workpieces from one support to another, a base, a carousel rotatably supported on said base, a transfer bar slidably supported by said carousel for rotation therewith, power means coupled to said transfer bar for slidably moving it relative to said carousel in a rectilinear movement between an extended position for reaching a workpiece on a support and a retracted position for moving the workpieces off of the support and onto said carousel or in a reverse direction for moving them off of said carousel and onto a support, a latch fixed to the workpieces, and securing means at the end of said transfer bar adapted to move into and out of engagement with said latch by an arcuate movement of said transfer bar in its extended position and produced by a rotary movement of said carousel for coupling and uncoupling the workpiece to said transfer bar while the workpiece is on a support.

3. An article transfer mechanism according to claim 2 wherein said workpieces are mounted on pallets, with one of said latches being secured to each of said pallets for cooperation with said transfer bar and including a plurality of supports with each support being adapted to carry one of said pallets, and indexing means connected to index said carousel for alignment with each of said supports for moving said pallets onto or off of said supports.

4. An article transfer mechanism according to claim 3 wherein said securing means at the end of said transfer bar is a hook that can be moved into and out of engagement with said latch by the arcuate movement of said transfer bar and including means for positioning said transfer bar to align said hook with said latch on said pallet so that the rotary movement of said carousel will move said hook into engagement with said latch for coupling the transfer bar to the pallet.

* * * * *